Oct. 4, 1966

J. HALLER 3,276,111

PROCESS OF MAKING A COMPLEX SINTERED POWDERED MATERIAL ARTICLE

Filed Oct. 18, 1963

INVENTOR.
JOHN HALLER
BY
Barthel & Bugbee
ATTORNEYS

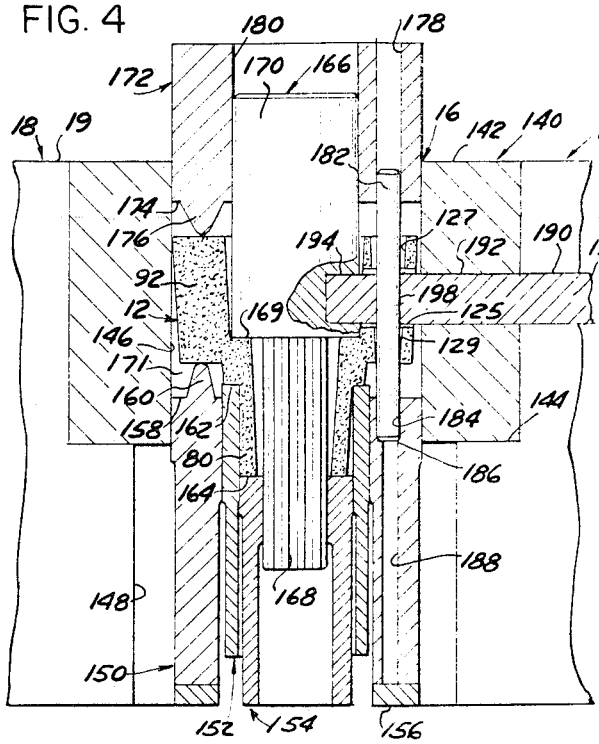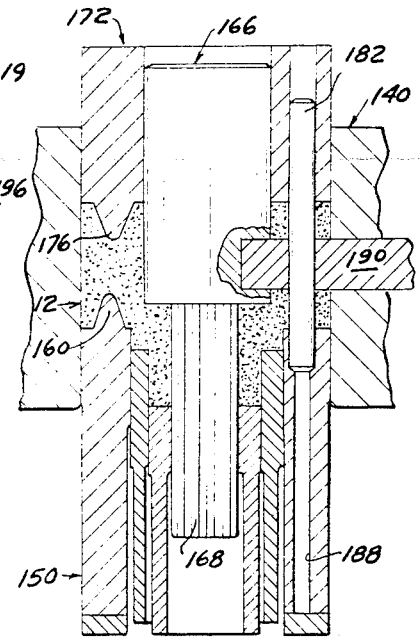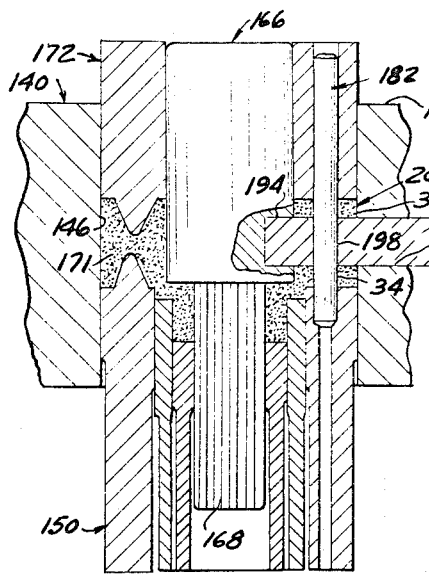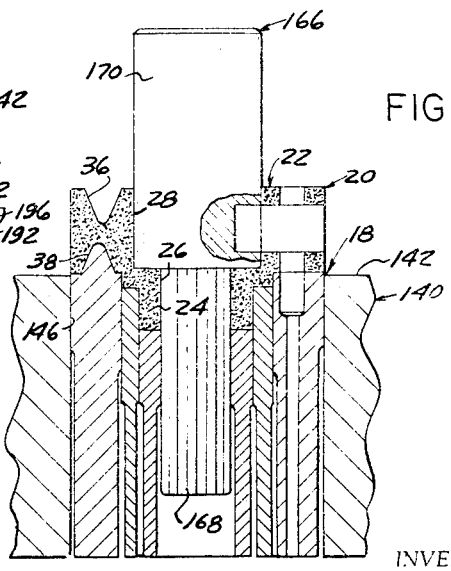

United States Patent Office

3,276,111
Patented Oct. 4, 1966

3,276,111
PROCESS OF MAKING A COMPLEX SINTERED
POWDERED MATERIAL ARTICLE
John Haller, Northville, Mich., assignor, by mesne assignments, to Federal-Mogul-Bower Bearings, Inc., Detroit, Mich., a corporation of Michigan
Filed Oct. 18, 1963, Ser. No. 317,368
15 Claims. (Cl. 29—420.5)

This invention relates to powder metallurgy and, in particular, to processes for producing complex sintered powdered material articles.

Hitherto, it has been very difficult, in producing complex sintered powdered material articles, to determine the correct fill ratios for the powdered material so as to obtain the proper weight of powdered material in the proper place in order to produce a final sintered powdered material article which has the desired densities and porosities throughout its extent. This problem has been particularly severe where the article to be produced has steps, flanges, recesses and apertures, and has hitherto necessitated the use of complicated dies and expensive high tonnage briquetting presses in order to bring about the motions necessary to produce a briquette with the desired density throughout the briquette. Hitherto, also, it has been difficult to determine the exact quantity of powdered material necessary to completely fill the die cavity without incomplete filling on the one hand producing defective parts with incomplete configuration and on the other hand an overfill of material producing excessive densities, too fine porosities and requiring the application of excessive tonnage by the briquetting press. The present process eliminates all of these disadvantages, as set forth below.

Accordingly, one object of this invention is to provide a process of producing complex sintered powdered material articles by first producing an excessively porous and fragile preform of powdered material containing the steps, flanges, recesses and apertures or other peculiarities of the ultimate workpiece yet of a size sufficiently larger than the ultimate workpiece that, when it is inserted in the die cavity of the briquetting press and subjected to pressing, it is crumbled into powder which spreads throughout the die cavity into every portion thereof, completely and accurately filling it.

Another object is to provide a process for producing complex sintered powdered material articles in the foregoing manner wherein the filling of the die cavity of the briquetting press establishes the correct fill ratios or compression ratios for the various portions of the ultimate article or workpiece without the need for complicated and expensive dies and briquetting presses and dispensing with the need for complex motions of various components of the briquetting pres and die since the fill ratios are already established in the fragile preform.

Another object is to provide a process for producing complex sintered powdered material articles in the foregoing manner wherein the preform is made by loosely filling a mold of refractory material with the powdered material without requiring compression of the powdered material, after which the mold and its contents are placed in an oven and subjected to a temperature well below the sintering temperature of the material so that the material particles adhere to one another sufficiently to enable the preform to be handled without breakage but leaving it sufficiently fragile and brittle when inserted in the die cavity of the briquetting press to be easily pulverized again upon the entry of the punch into the die cavity.

Another object is to provide a process for producing complex sintered powdered material articles in the foregoing manner, wherein the crumbled powder, after the reduction of the preform to powder by the punch operating in the die cavity, is further compressed until the desired density is attained, whereupon the briquette is expelled from the die cavity and subjected to sintering in a sintering oven at the usual sintering temperatures so that it occupies a smaller volume than the preform occupied but with a greatly increased density and with exceedingly great structural strength and rigidity, thereby producing a complex part of adequate accuracy and strength at a cost far below that entailed by machining the part from a casting or by other procedures than that of the present invention.

Another object is to provide a process for producing complex sintered powdered material articles in the foregoing manner, wherein the preform is provided with tapers not found in the ultimate workpiece but which facilitate the expulsion of the preform from the refractory mold and which also facilitate the pulverization of the preform in the die cavity of the briquetting press.

Another object is to provide a process for producing complex sintered powdered material articles in the foregoing manner, wherein apertures or passageways are formed in the preform and also in the ultimate briquette made therefrom by providing retractible cores either removable longitudinally or laterally of the mold cavity after filling and coalescing heating have been accomplished.

Another object is to provide a process for producing complex sintered powdered material articles of a slightly modified nature in that the preform is made up of a plurality of component preforms produced in the above-mentioned manner and which upon insertion in the briquetting press die cavity, constitutes a composite preform completely filling the die cavity and enabling the production of articles wherein a single preform is too complex to be produced, but wherein a composite preform can be produced in separate components.

Another object is to provide a process for producing complex sintered powdered material articles wherein portions of the briquettes are locally additionally densified to the desired degree by the provision of noses upon the punches which produce corresponding non-functional recesses or depressions in the briquette causing the localized densification.

Other objects and advantages of the invention will become apparent during the course of the following description of the accompany drawings, wherein:

FIGURE 4 is a central vertical section through a die of a briquetting press, together with the associated puches thereof, at the start of the pressing operation immediately after the preform of FIGURE 1 has been inserted in the die cavity;

FIGURE 5 is a view similar to FIGURE 4, but showing the relative positions of the parts after the preform has been fractured and pulverized but before compression has been completed;

FIGURE 6 is a view similar to FIGURES 4 and 5, but showing the relative positions of the parts after compression has been completed and the briquette formed, ready for ejection from the die cavity; and FIGURE 7 is a view similar to FIGURES 4, 5 and 6 but showing the relative positions of the parts with the briquette almost entirely ejected from the die cavity.

Figure 2:
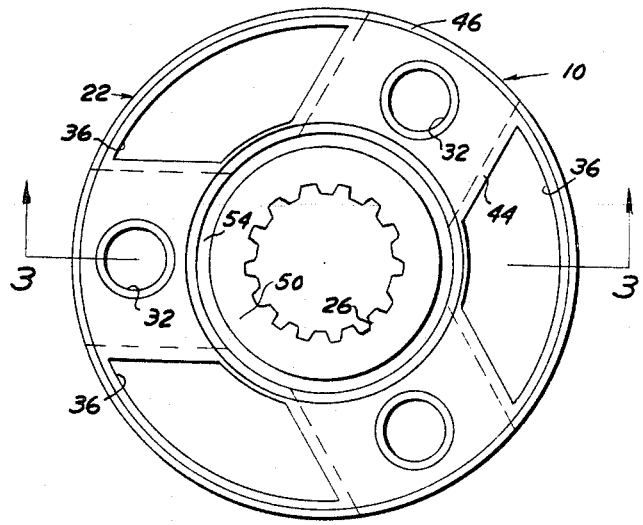
FIGURE 2 is a top plan view of a sintered powdered material article or workpiece produced from the preform of FIGURE 1.
Figure 3:
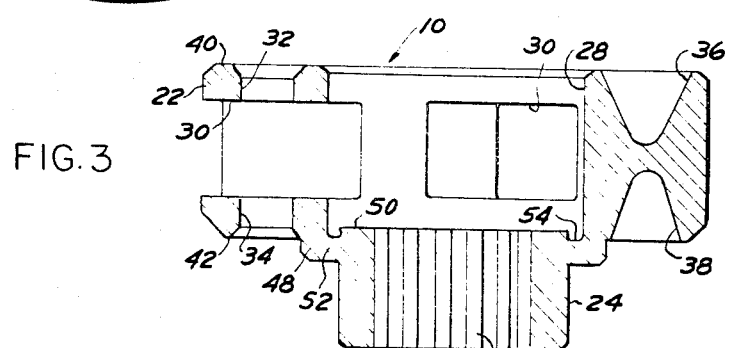
FIGURE 3 is a central vertical section through the sintered powdered material article of FIGURE 2, taken along the line 3—3 therein.

Referring to the drawings in detail, FIGURES 2 and 3 show a sintered powered material article or workpiece, generally designated 10, produced by briquetting and sintering from a preform, generally designated 12, of powdered material (FIGURE 1) of substantially the same diameter and of similar but more elongated shape than the article 10. The preform is produced in a preform mold set, generally designated 14, so as to be of much greater porosity and fragility than the article 10 and is subsequently fractured and pulverized in a briquetting punch and die set, generally designated 16 (FIGURES 4 to 7 inclusive) mounted in the die table 19 of a conventional briquetting press, generally designated 18, of which only the die table 19 is shown, to produce a briquette 20 (FIGURE 7) of lesser porosity and greater density and of substantially the same size and shape as the ultimate workpiece or article 10, from which briquette 20, by subsequent sintering, the ultimate workpiece or article 10 is produced. The mold set 14 for the production of the preform 12 is of any suitable shape and construction depending upon the article to be produced, the particular article 10 being shown by way of exemplification but not limitation. The article 10 in the example shown is a planet gear carrier or rotor for use in a planetary transmission, such as are installed in modern automobiles, and is used as an example because of its complexity.

In general, the article or workpiece 10 chosen as an example produced by the present process is roughly in the form of a wheel having a cylindrical main body 22 from which a hub 24 extends axially and contains a splined bore 26 by which it is operatively connected to the remainder of the planetary transmission (not shown). The threaded bore 26 opens into a central counterbore or cylindrical recess 28 of larger diameter than the bore 26 and in turn opening into three radial passageways 30 of rectangular cross-section adapted to contain the planet pinions (not shown) of the transmission, which pinions are mounted upon axles (not shown) inserted and seated at their opposite ends in aligned forward and rearward holes 32 and 34 respectively formed in the cylindrical body 22 with their axes parallel to the common axis of the threaded bore 26 and counterbore 28.

In order to locally densify the peripheral portions of the article 10, the latter (FIGURE 3) is optionally provided with circumferentially-spaced indentations or depressions 36 and 38 formed, as will be subsequently described, by circumferentially-spaced noses on the punches of the die set 16. These indentations 36 and 38 may be omitted where such local additional densification is not required or desired. The indentations 36 and 38 extend inwardly from the top and bottom surfaces 40 and 42 of the body portion 22 and establish radial spoke-like portions 44 extending from the counterbore 28 to the rim or peripheral portion 46 and containing the holes 32. The body portion 22 has an external cylindrical surface. A shouldered flange or annular step portion 48 extends between and interconnects the body portion 22 and hub portion 24 (FIGURE 3), the latter of which has an annular abutment inner end surface 50 at the bottom of the counterbore 28 and raised above the surrounding end wall 52 by an annular groove 54.

The mold set 14 in which the preform 12 is produced consists generally of a mold body 56 (FIGURE 1), a central main core 58, outlying pin cores 60 spaced circumferentially apart from one another in correspondence with the circumferential spacing of the axle holes 32, 34, and transverse radial removable core bars 62 having holes 64 for the passage of the pin cores 60 and capable of withdrawal from the mold body 56 upon withdrawal of the pin cores 60. The core 58 provides the central opening in the preform 12 which, in the final workpiece 10, becomes the counterbore 28 and threaded bore 26. The core bars 62 are of rectangular cross-section and form the circumferentially-spaced radial openings which ultimately become the radial passageways 30 in the final workpiece 10. The pin cores 60, as stated before, form the openings which ultimately become the axle-receiving holes 32 and 34 in the final workpiece 10.

The mold body 56 of the mold set 14 (FIGURE 1) contains a central mold cavity, generally designated 68, consisting of a lower small-diameter opening 70 of cylindrical form snugly receiving the lower end portion of the core 58; an annular radial surface 72 forming the abutment for the bottom end 74 of the preform 12; a lower tapered or conical bore 76 which forms the tapered lower surface 78 of the lower preform portion 80 which ultimately becomes the hub portion 24 of the workpiece 10 of FIGURE 3; an annular radial surface 82 and a short tapered surface 84 which collectively form the annular step 86 in the preform 12 which ultimately becomes the shouldered step portion 48 of the ultimate workpiece 10; an annular upper radial surface 88 which forms the shoulder 90 on the upper portion 92 of the preform 12 which becomes the body portion 22 of the workpiece 10; and an upper tapered surface 94 which forms the tapered upper outer surface 96 of the upper portion 92 of the preform 12.

The core 58 includes a cylindrical lower end portion or pilot portion 98 (FIGURE 1) snugly fitting the mold body bore 70, a tapered smaller-diameter lower portion 100 forming the tapered lower inner surface 102 of the preform 12, an annular radial surface 104 forming the preform shoulder 106, and a tapered upper portion 108 forming the tapered upper inner portion 110 of the preform 12. A small annular shoulder 112 lies between the pilot portion 98 and the lower tapered portion 100 of the core 58 and bottoms on the annular radial surface 74 of the mold body 56 to aid the pilot portion 98 and bore 70 in properly locating the core 58 coaxial with the outer wall 114 of the mold cavity, generally designated 116, containing the preform 12.

Figure 1:
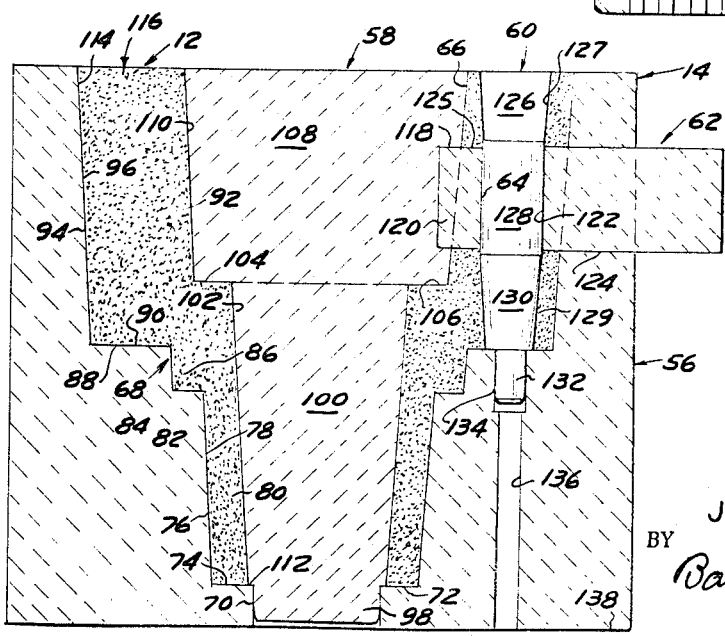
FIGURE 1 is a central vertical section through a preform mold employed in making a pulverizable preform according to the present invention, with the mold cavity filled with the powdered material after heating to produce the fragile preform.

The upper portion 108 of the core 58 at circumferentially-spaced locations corresponding to the locations of the radial passageways 30 is provided with sockets 118 for removably receiving the slightly-tapered inner end portions 120 of the core bars 62, which have bores 122 therein disposed parallel to the axis of the mold cavity 116 for removably receiving the pin cores 60. The mold body 56 is provided with radial openings 124 of rectangular cross-section for slidably and removably receiving the core bars 62 after the pin cores 60 have been withdrawn in an axial direction from the bores 122. The core bars 62 form circumferentially-spaced passageways 125 of rectangular cross-section in the preform 12 (FIGURE 1).

Each pin core 60 consists of an upper tapered portion 126 (FIGURE 1) forming a tapered upper hole 127 in the preform 12, an intermediate cylindrical portion 128 smoothly but removably fitting the bore 122 in its respective core bar 62, a tapered lower portion 130 forming a tapered lower hole 129 in the preform 12 (FIGURE 1) and a cylindrical small-diameter lower end portion or pilot portion 132. The latter snugly but removably fits a counterbore 134 in the upper end of a bore 136 extending downward from the mold cavity 116 to the bottom surface 138 of the mold body 56. The mold body 56, core 58, pin cores 60 and core bars 62 are made from any suitable refractory material capable of withstanding the moderate heat of approximately 1300° F. to 1600° F. Carbon rod, such as graphite, has been found suitable for this purpose.

The briquetting press 18, of which only the die table 19 is shown, is of conventional construction, of which several forms are available on the open market and well-known to those skilled in the powder metallurgy art. One such press, for example, is disclosed and claimed in Haller Patent No. 2,762,078 dated September 11, 1956, for Molding Press with Adjustable Core Rod. The die table 19 is of course mounted on the press 18 and the die set 16 mounted in a recess 139 in the die table 18. The die set 16 includes a die body 140 having upper and lower surfaces 142 and 144 respectively and a cylindrical die bore 146 extending between them. Reciprocably mounted in the die bore 146 and extending downwardly through a suitable clearance opening 148 in the die table 19 are telescoping tubular outer, intermediate and inner lower punches 150, 152 and 154 respectively (FIGURE 4) selectively movable or held temporarily stationary by the lower hydraulic piston and cylinder units of the briquetting press 18. An annular stop or spacing ring 156 is mounted at the lower end of the lower outer tubular punch 150.

The annular upper end surface 158 of the lower outer punch 150 determines the lower surface 42 of the body portion 22 of the article or workpiece 10, except for the beveled edges thereof, and the three upstanding nose portions 160 (one only being shown in the drawings) on the upper end surface 158 determine the depths and sizes of the lower densifying recesses 38. The upper end surface 162 of the intermediate lower punch 152 determines the bottom and height of the annular shouldered flange or step 48 on the workpiece 10, whereas the upper end surface 164 of the lower inner punch 154 determines the lower end surface of the hub portion 24 of the workpiece 10. The distances between the annular end surfaces 158, 162 and 164 in the final pressing position of the press 19 (FIGURE 6) determine the axial dimensions of the body portion 22 and hub portion 24 of the workpiece 10.

Also associated with the die set 16 is a core rod 166 (FIGURE 6) having a splined lower reduced diameter portion 168 telescoping with the lower inner tubular punch 154 and separated by an annular shoulder 169 at its upper end from an enlarged cylindrical head 170. The core rod 166 cooperates with the die bore 146 and the tubular lower punches 150, 152 and 154 to define a die cavity, generally designated 171. The head 170 telescopes with an upper tubular punch 172 which in turn telescopes with the die bore 146 and is connected to the upper platen or plunger of the briquetting press 19. The upper tubular punch 172 has a lower end pressing surface 174 from which three nose portions 176 (one only being shown) project downwardly to form the densifying recesses 36 on the upper side of the body portion 22 of the workpiece 10.

The upper tubular punch 172 is provided with three circumferentially-spaced outlying bores 178, the axes of which are parallel to the axis of the central bore 180 which slidably receives the head 170 of the core rod 166. The bores 178 snugly but slidably receive pin cores 182 which are of straight cylindrical shape, in contrast to the somewhat tapered shapes of the pin cores 60 of the mold set 14. The pin cores 182 form the circumferentially-spaced aligned upper and lower holes 32, 34 for the planetary pinion axles of the workpiece 10. Each pin core 182 at its lower end is snugly but removably seated in a corresponding counterbore 184 against the annular shoulder 186 at the upper end of a bore 188 disposed parallel to the axis of the die bore 146 but spaced radially inward therefrom. There are three circumferentially-spaced counterbores 184 and bores 188 corresponding to the three sets of upper and lower holes 32 and 34 in the workpiece 10. The bores 178 and 188 are of course coaxial with one another in order to properly receive the upper and lower ends of the pin cores 182 during the operation of the press 19, as explained below.

In order to form each radial passageway 30 in the workpiece 10, the die table 19 and the die body 140 are provided with aligned bores 190 and 192 (FIGURE 4) which in turn are aligned with a recess or socket 194 in the head 170 of the core rod 166. There are three sets of the bores 190 and 192 and recess 194 in circumferentially-spaced relationship at equal intervals corresponding to the similar spacing of the three passageways 30 (FIGURE 2), only one set being shown in FIGURES 4 to 7 inclusive. Slidably mounted in each set of bores 190 and 192 and socket 194 is a core bar 196 also of rectangular cross-section corresponding to the rectangular cross-sections of the bores 190, 192, socket 194 and radial passageways 30 in the workpiece 10. Cam mechanism (not shown) is connected to the core bars 196 to retract them from the socket 194 and die bore 146 when the pin cores 182 have been withdrawn from aligned bores 198 in their respective core bars 196 during the operation of the briquetting press 18, as described below. Any other suitable means for reciprocating the core bars 196 may be provided, such as solenoids or fluid pressure cylinders and pistons in order to move the core bars 196 into the die bore 146 and sockets 194 before beginning pressing (FIGURE 4) and for retracting them therefrom after terminating pressing and withdrawing the pin cores 182 (FIGURE 7).

In the operation of the process of the invention, to make the preform 12 of FIGURE 1, the mold set 14 is assembled with the core 58 first placed in position, followed by the insertion radially of the inner end portions 120 of the core bars 62 through the openings 124 and across the mold cavity 116 into their respective sockets 118 in the upper portion 108 of the core 58. The pin cores 60 are now lowered into the mold cavity 116 between the core 58 and the mold body 56 with their central portions 128 inserted through the core bar bores 64 and with their pilot portions 132 inserted in the mold body counterbores 134. The mold cavity 116, thus formed, is of similar diameter and shape to the die cavity 171 but is of greater axial elongation than the briquette 20 to be made. It is now filled with the powdered material, such as powdered metal or powdered nylon, without substantially compressing the material.

The metal particulate filled mold set 14 is then transferred to a heat processing oven where it is subjected to a temperature of 1300° to 1600° F. for a period of time between 20 minutes and 45 minutes, depending upon the size of the preform 12 to be produced and the particular powdered material being used. The temperature employed in this oven must be below the sintering temperature of the material, which is ordinarily 1850° F., to 2400° F., the time and temperature chosen being merely sufficient to cause the particles to adhere to one another sufficiently firmly to form a self-sustaining mass sufficiently strong to permit handling but sufficiently fragile to permit easy subsequent pulverization in the die cavity of the briquetting press without requiring excessive pressures very much above the briquetting pressures ordinarily required. Experimentally, temperatures as low as 800° F. have been successfully employed in the present process, but produce insufficient adhesion of the particles to permit safe handling under production conditions, and prevent prematurely fracturing the preform 12. The purpose of this heating operation is to cause the particles in the preform 12 merely to adhere to one another only strongly enough to hold together and enable handling. The carbon mold set 14 can be put through the furnace repeatedly and used over and over again to produce a large number of preforms 12. The material from which the mold set 14 is made does not have to possess great structural strength, as does a briquetting die set, because it is not required to be subjected to compression forces but only to heating.

After the heating operation has been carried out, the mold set 14 is removed from the furnace and permitted to cool, after which the pin cores 60 are pushed out of their bores 64 in the core bars 62 and expelled from the mold cavity 116, whereupon the core bars 62 are withdrawn radially out of their sockets 118 and openings 124 in the mold body 56. The core 58 is then withdrawn upwardly such as by pushing upon its lower end portion or pilot portion 98, whereupon the preform 12 is removed from the mold cavity 116 in the mold body 114. Such removal is facilitated by the tapered portions 78, 84 and 96. The elongated preform 12 is now fragile, brittle and highly porous, but is sufficiently strong to sustain reasonable and careful handling, and is ready for repulverization in the briquetting press 18.

To form the briquette 20 from the elongated preform 12, the operator first removes the core rod 166 and finished briquette 20 of the previous pressing operation from the briquetting press 18. With the moving parts of the press 18 in the relative positions shown in FIGURE 7 of the previous pressing operation, he retracts the outer, intermediate and inner tubular puches 150, 152 and 154 respectively downward within the die bore 146 into their relative positions shown in FIGURE 4, thereby axially elongating the die cavity 171. He then lowers the elongated preform 12 into the die bore 146 until it comes to rest upon the noses 160 of the outer tubular lower punch 150, and rotates it until its passageways 125 are aligned with the bores 192 containing the temporarily retracted core bars 196. The operator then lowers the core rod 166 into the preform 12, with the lower splined portion 168 thereof passing through the tapered bore 102 in the preform 12 and with the enlarged head 170 entering the enlarged upper tapered bore 110 with its lower shoulder 169 resting upon the shoulder 106 of the preform 12. Meanwhile, the lower core portion 168 has entered and telescoped with the lower inner tubular punch 154 and the operator has aligned the sockets 194 with the bores 192 and 190 containing the core bars 196.

The operator now operates the core bar moving mechanism (not shown) to move the inner ends of the core bars 196 through the preform passageways 125 into their respective sockets 194, whereupon the operator then drops the pin cores 182 through the upper and lower tapered holes 127 and 129 in the preform 12 and through the aligned holes 198 in the core bars 196 into the counterbore 184 in the lower outer tubular punch 150. The die set 16, thus filled by the preform 12, is now ready for the pressing operation.

To pulverize the fragile and highly porous elongated preform 12, now in the position shown in FIGURE 1, the operator operates the briquetting press 18 to energize the platen thereof and cause the upper punch 172 to move downward into the die bore 146 of the die cavity 171. At the same time, the outlying paraxial bores 178 telescope with the upper ends of the pin cores 182. The moving parts now occupy the temporary instantaneous positions shown in FIGURE 4.

With the lower tubular punches 150, 152 and 154 and the core rod 166 held temporarily immovable, the upper punch 172 continues to travel downward in the die cavity 171 into the successive positions shown in FIGURES 5 and 6. The descent of the upper tubular punch 172 causes its bore 180 to telescope with the enlarged head 170 of the core rod 166 while its nose portions 176 engage and push downward upon the enlarged upper portion 92 of the elongated preform 12. At the same time, the lower tubular plungers 150, 152 and 154 are caused to move upward while the core bars 196 hold the upper and lower portions 170 and 168 of the core rod 166 stationary (FIGURE 5). This compressing action effects a crushing and pulverization of the preform 12, shortening the axial length of the die cavity 171, and causes the resulting powdered material to fill all parts of the die cavity 171 with the minimum travel required for the particles, because of the approximately corresponding shape and similar cross-sectional size of the elongated preform 12 to the die cavity 171. The core bars 196 and pin cores 182 of course prevent the powdered material from entering the spaces which they occupy.

The consequent final motion of the upper punch 172 and lower punches 150, 152 and 154 toward one another (FIGURE 6) compresses the powdered material within the die cavity 171 and the noses 176 and 160 in moving toward one another form the recesses 36 and 38 in the resulting briquette 20. These become the similarly numbered recesses 36 and 38 in the workpiece 10 after the briquette 20 has been sintered. This action decreases the porosity and increases the density of the portions of the briquette 20 lying in the vicinity of the recesses 36 and 38 produced by the nose portions 176 and 160 upon the upper punch 172 and lower outer tubular punch 150.

When compression of the powdered material has been accomplished in this manner to form the briquette 20 (FIGURE 6), the upper tubular punch 172 is retracted upward out of the die cavity 171 by operating the briquetting press 18 to move its platen upward, withdrawing the upper tubular punch 172 from the die bore 146. At the same time, the upward travel of the upper punch 172 withdraws its outlying bores 178 from its telescoping relationship with the pin cores 182, leaving the tops of these exposed, and projecting above the top surface 142 of the die body 140. The operator then pulls upward on the pin cores 182 to withdraw them from the aligned holes 32 and 34 in the briquette 20 and 198 in the core bars 196. He then actuates the core bar retracting mechanism to move the core bars 196 outwardly from their positions in the sockets 194 in the head 170 of the core rod 166 and from the die cavity 171 into their bores 192. This action frees the briquette 20 for subsequent ejection from the die cavity 171.

To eject the briquette 20 from the die cavity 171, the operator operates the briquetting press 18 to move the lower tubular punches 150, 152 and 154 upward from the positions shown in FIGURE 6 to those shown in FIGURE 7. This action pushes the body portion 22 of the briquette 20 upwardly out of the die cavity 171 into a position approximately on the same level as the upper surface 142 of the die body 140, with the moving parts reaching the relative positions shown in FIGURE 7. The operator then lifts upward on the head 170 of the core rod 166, withdrawing it and its reduced diameter lower portion 168 from the counterbore 28 and bore 26 of the briquette 20. The briquette 20 is then lifted to withdraw its hub portion 24 from the remaining lower end portion of the die cavity 171. Thereupon the briquette 20 is transferred to a sintering oven and sintered in the conventional manner at temperatures of approximately 1850° to 2400° F., depending upon the particular powdered material being used and the size of the article 10 being produced. The sintering operation unites the particles of the briquette 20 by surface fusion thereof and thereby converts the moderately fragile briquette 20 into the strong and breakage-resistant workpiece 10, except for any subsequent machining operations, such as beveling the edges of the body portion 22 and threading the bore 26 in the hub portion 24.

By means of this process, the workpiece 10 has been produced from a briquette 20 by the pulverization of the similarly-shaped but elongated, fragile and highly porous preform 12 in the die cavity 171, resulting in the achieving of the desired density of the workpiece 10 and consequently the desired structural strength thereof. At the same time, the need for excessively complicated briquetting presses and dies with intricate motions of their working parts has been eliminated by reason of the preparation and use of the fracturable, highly porous, elongated preform.

While it has been shown in the present disclosure how a complex article may be produced from powdered material where the article has transverse passageways and outlying holes spaced apart from the central bore of the article, it will be understood that a similar procedure may be employed for articles of complex shape lacking either the transverse passageways or the outlying holes or both.

This is done by omitting the core bars 62 and 196 from the mold set 14 and die set 16 respectively where no transverse passageways are to be formed, and omitting the pin cores 60 and 182 from the mold set 14 and die set 16 where outlying holes are not required. In such articles, the principles of the invention still obtain because the making and use of the fracturable and easily pulverizable elongated preform still enables the correct fill ratios to be established and the desired densities in the workpiece to be obtained in the manner set forth above.

A modification of the present invention enables the production of still more complicated sintered powdered material workpieces by effecting the production of a composite preform made up of separate individual component preforms each produced in the above-described manner, the component preforms being superimposed or stacked in the die cavity to constitute the composite preform and thereafter subjected to the above-described pressing operation to pulverize the composite preform and convert it into the desired briquette. The sintering is then carried out in the above-described manner to convert the briquette into the desired sintered powdered material article.

What I claim is:

1. A process of making a complex sintered powdered material article, comprising
    confining a mass of particles of powdered material in a mold cavity of similar shape and cross-sectional size to the article to be produced therefrom but of greater axial elongation,
    heating the thus-confined particles to a temperature and for a time period well below the sintering temperature and time period thereof sufficient to effect adhesion of the particles to one another into a self-sustaining but fragile and easily pulverizable preform,
    transferring the preform from the mold cavity to a die cavity,
    compresing the preform in the die cavity into pulverization of the preform and distribution of its component particles throughout the die cavity,
    further compressing the mass of particles from the pulverized preform in the die cavity into a briquette of greater density and lesser porosity than the preform,
    transferring the briquette from the die cavity to a sintering zone,
    and heating the briquette in the sintering zone to a temperature and for a time period sufficient to fuse the component particles of the briquette into the desired sintered powdered material article.

2. A process of making a complex sintered powdered material article, according to claim 1, wherein the die cavity is of substantially the same cross-sectional size and shape as the preform.

3. A process of making a complex sintered powdered material article, according to claim 1, wherein a mold core is positioned in the mold cavity and produces a hollow preform, and wherein a die core is positioned in the die cavity and produces a hollow briquette.

4. A process of making a complex sintered powdered material article, according to claim 1, wherein the mold cavity is tapered whereby to facilitate ejection of the preform therefrom.

5. A process of making a complex sintered powdered material article, according to claim 3, wherein the mold cavity and mold core are tapered in the same direction whereby to facilitate ejection of the hollow preform therefrom.

6. A process of making a complex sintered powdered material article, according to claim 1, wherein a retractible transverse mold core is disposed in the mold cavity to produce a transverse recess in the preform, and wherein the transverse core is removed from the mold cavity prior to removal of the preform from the mold cavity.

7. A process of making a complex sintered powdered material article, according to claim 3, wherein the mold core is provided with a socket and wherein a retractible transverse core is disposed in the mold cavity with one end seated in the socket to produce a transverse passageway in the preform, and wherein the transverse core is removed from the socket and mold cavity prior to removal of the hollow preform from the mold cavity.

8. A process of making a complex sintered powdered material article, according to claim 1, wherein an outlying longitudinal mold core is disposed in the mold cavity in laterally-spaced relationship with the center of the mold cavity during formation of the preform to produce a longitudinal opening therein.

9. A process of making a complex sintered powdered material article, according to claim 8, wherein the outlying longitudinal mold core is removably inserted in the mold cavity during formation of the preform and is removed from the mold cavity prior to removal of the preform from the mold cavity.

10. A process of making a complex sintered powdered material article, according to claim 6, wherein a retractible transverse die core is disposed in the die cavity during briquetting and extends into the transverse recess in the preform, and wherein the transverse die core is removed from the die cavity prior to removal of the briquette from the die cavity.

11. A process of making a complex sintered powdered material article, according to claim 7, wherein the die core is provided with a socket, and wherein a retractible transverse die core is disposed in the die cavity with one end seated in the die core socket with its intermediate portion passing through the transverse passageway in the preform, and wherein the transverse die core is removed from the die core socket and die cavity after the formation of the briquette and before ejection thereof from the die cavity.

12. A process of making a complex sintered powdered material article, according to claim 8, wherein an outlying longitudinal die core is disposed in the die cavity and passes through the outlying longitudinal preform opening.

13. A process of making a complex sintered powdered material article, according to claim 12, wherein the outlying longitudinal die core is removably inserted in the die cavity during formation of the briquette and is removed from the die cavity prior to removal of the briquette from the die cavity.

14. A process of making a complex sintered powdered material article, according to claim 1, wherein a plurality of component preforms are produced and are superimposed in the die cavity as a composite preform during briquetting.

15. A process of making a complex sintered powdered material article, according to claim 1, wherein the preform is additionally subjected to local additional deformation to produce a corresponding depression effecting additional densification of the particles in the vicinity of the depression.

References Cited by the Examiner

UNITED STATES PATENTS

| | | | |
|---|---|---|---|
| 2,298,885 | 10/1942 | Hull | 75—221 |
| 2,675,310 | 4/1954 | Hall. | |
| 2,725,265 | 11/1955 | Daniels et al. | |
| 2,789,901 | 4/1957 | Shipe et al. | 75—214 |

JOHN F. CAMPBELL, *Primary Examiner.*

P. M. COHEN, *Assistant Examiner.*